United States Patent [19]
Mussard et al.

[11] Patent Number: 4,735,103
[45] Date of Patent: Apr. 5, 1988

[54] FORCE SENSOR

[75] Inventors: Yves Mussard; Michel Christen, both of Neuchâtel, Switzerland

[73] Assignee: Asulab S.A., Bienne, Switzerland

[21] Appl. No.: 915,469

[22] Filed: Oct. 6, 1986

[30] Foreign Application Priority Data

Oct. 10, 1985 [FR] France ............................ 85 15163

[51] Int. Cl.⁴ .................................................. G01L 1/10
[52] U.S. Cl. ............................ 73/862.59; 73/DIG. 1
[58] Field of Search .................. 73/704, 778, 517 AV, 73/862.59, DIG. 1; 310/338

[56] References Cited

U.S. PATENT DOCUMENTS

| | | | |
|---|---|---|---|
| 3,470,400 | 9/1969 | Weisbord | 73/DIG. 1 |
| 3,672,220 | 6/1972 | Agar | 73/704 |
| 3,960,009 | 6/1976 | Roepke et al. | 73/778 X |
| 4,221,133 | 9/1980 | Olsen | 73/704 |
| 4,372,173 | 2/1983 | EerNisse et al. | |
| 4,379,226 | 4/1983 | Sichling et al. | 73/DIG. 1 |
| 4,498,344 | 2/1985 | Dinger | 73/778 |

FOREIGN PATENT DOCUMENTS

| | | | |
|---|---|---|---|
| 1522971 | 3/1968 | France . | |
| 0559135 | 5/1977 | U.S.S.R. | 73/DIG. 1 |

*Primary Examiner*—Charles A. Ruehl
*Attorney, Agent, or Firm*—Pollock, Vande Sande & Priddy

[57] ABSTRACT

A force sensor comprising a resonator (10) having a frequency that varies with the force being measured. The resonator includes an oscillatory bar (101, 102) and a pair of anchor members (12, 103, 104) that are connected each to a corresponding end portion of the bar and which are adapted to apply the force having to be measured to the bar. The sensor further comprises a tube (16) that surrounds the resonator and which is rigidly secured by its end portions to the anchor members (12).

12 Claims, 2 Drawing Sheets

FORCE SENSOR

BACKGROUND OF THE INVENTION

1. Field of the invention

This invention relates to a force sensor of the kind that comprises a resonator having a frequency which varies with the intensity of the force having to be measured and including an oscillatory bar, and a pair of anchor members that are rigidly connected each to a corresponding end portion of the bar and which serve to apply the force having to be measured to the bar.

2. Prior art

Such a sensor is for instance described in U.S. Pat. No. 4,372,173. In this patent, the resonator is made of a thin plate of quartz that is photochemically manufactured and having the shape of either a bar or a double tuning fork. The advantage of this kind of resonator is that it has a high quality factor and great sensitivity to the application of a force. Accuarate measurments can as a result be made. Moreover, since the information associated with the frequency of the resonator is processed by an electronic circuit, it can be supplied in digital rather than analogical form, a feature that has many advantages. Unfortunately, because use is made of a quartz resonator, the sensor tends to be rather delicate, which is why, to this day, such a sensor has primarily been used in a laboratory environment.

SUMMARY OF THE INVENTION

An object of the invention is to provide a force sensor that can also be used in a more demanding or rigorous environment.

Additionally, the above kind of sensor not only is sensitive to the application of an axial force, but also reacts to forces that induce flexion or twisting of the sensor. In most cases, only one component of the force is of interest, i.e. that acting axially of the resonator bar.

Another object of the invention is to provide a force sensor of the above set forth kind whose relative directional sensitivity is enhanced axially of the bar.

To these ends the sensor is provided with a tube that surrounds the resonator and which is rigidly secured by end portions thereof to the anchor members.

BRIEF DESCRIPTION OF THE DRAWINGS

In the accompanying drawings, given by way of example.

DETAILED DESCRIPTION

Figure 1:
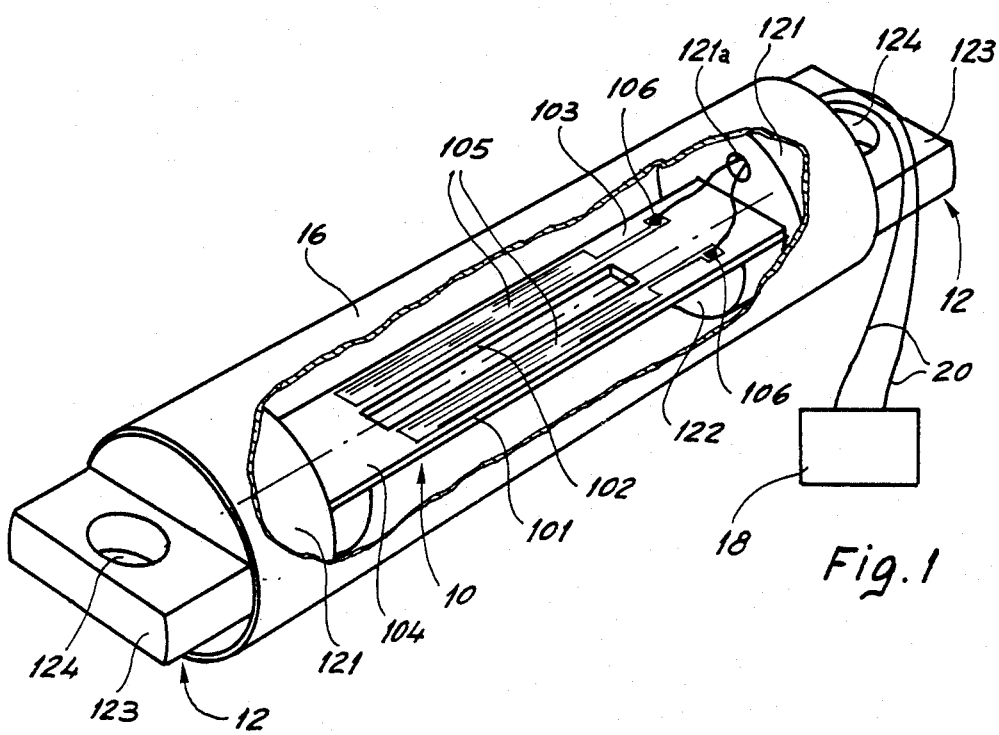
FIG. 1 is a perspective view of a sensor according to the invention.

The device shown in FIG. 1 comprises a resonator 10, a pair of supports 12, a tube 16, a diagrammatically illustrated control and measurement circuit 18 and leads 20 connecting resonator 10 to circuit 18. Resonator 10 is of the double tuning fork kind and includes a pair of bars 101 and 102 whose opposite ends are connected by bases 103 and 104 respectively. Bars 101 and 102 carry diagrammatically illustrated electrodes 105 for sustaining the vibrations of resonator 10. Base 103 carries output terminals 106 which are connected to electrodes 105 and to which are soldered leads 20 thereby linking resonator 10 to circuit 18. Each support 12 has a first, cylindrical portion 121, having a diameter slightly less than the inner diameter of tube 16, which is bonded with adhesive to the inner surface of tube 16, at a corresponding end thereof. One portion 121 is formed with a hole 121a which extends parallel to the axis of tube 16 and through which leads 20 issue from the interior of tube 16. Supports 12 further have each, adjacent portion 121, a semi-cylindrical seating 122 for supporting resonator 10, with bases 103 and 104 each being bonded with adhesive to a corresponding seating 122. Supports 12 additionally have each a lug 123, formed with a hole 124, whereby a force may be applied to the sensor and more particularly to resonator 10. Lugs 123 are of generally parallelepipedic shape, their width being substantially equal to the diameter of cylindrical portions 121, and are located outside tube 16.

Supports 12 and bases 103 and 104 together form anchor members whereby a force having to be measured may be applied to bars 101 and 102 and to which tube 16 is rigidly secured by its end portions.

Figure 2:
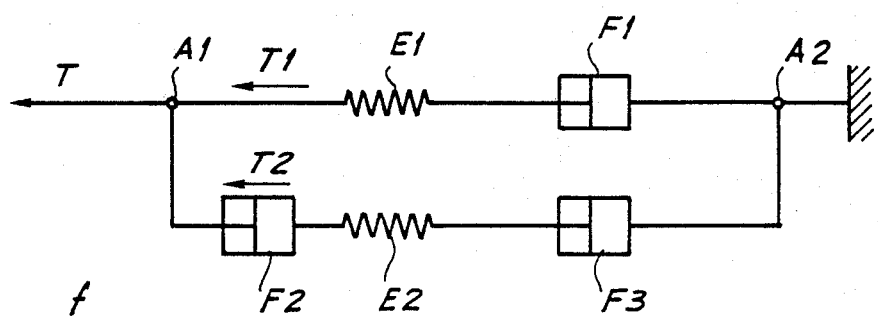
FIG. 2 is a diagram setting forth the mechanical characteristics of the sensor shown in FIG. 1.

Tube 16, supports 12 and the adhesives used for assembly purposes must satisfy certain conditions so as not adversely to affect the accuracy of the sensor. More exactly, resonator 10 must not be subjected to stresses other than that exercised by the force to be measured. This involves eliminating or at least compensating the stresses generated by flow or expansion of one or other of the sensor's components. To understand how these stresses may be generated, reference should be made to FIG. 2 which is a diagram of the mechanical principle of the sensor. In this diagram the sensor comprises two elastic bodies E1 and E2, three flowing bodies F1, F2 and F3 and two rigid anchor members A1 and A2. Elastic body E1 is mounted in series with flowing body F1. Elastic body E2 is mounted in series with flowing bodies F2 and F3. The limbs or branched formed by E1 and F1, on the one hand, and by E2, F2 and F3, on the other, are mounted in parallel and are rigidly secured to A1 and A2. Elastic bodies E1 and E2 respectively represent the elastic characteristics of resonator 10 and of the tube 16. Flowing bodies F1, F2 and F3 respectively represent the flow characteristics of the layer of adhesive that bonds resonator 10 to seatings 122, of the layer of adhesive that bonds tube 16 to portions 121 and of the material forming tube 16 itself.

When a force T is applied to anchor members A1 and A2 (acting force and reacting force), it can be resolved into two forces T1 and T2 (with one being applied to limb E1, F1 and the other being applied to limb E2, F2, F3).

On applying force T, forces T1 and T2 are defined by the elasticity of bodies E1 and E2, the deformation of these bodies through elongation necessarily having to be equal as both limbs are mounted in parallel on anchor members A1 and A2.

Applying forces T1 on F1 and T2 on F2 and F3 causes them to flow and elongation of limbs E1, F1 and E2, F2, F3 ensues. If the elongations induced by T1 on F1 and by T2 on F2 and F3 are equal, then T1 and T2 remain constant. But if T1 causes a greater flow on F1 than T2 on F2, F3 then the elongation due to flow increases on limb E1, F1 at the expense of the elongation due to elasticity, since the elongation of the two limbs remains constant. In other words, T1 decreases, hence a decrease in the elastic elongation, as also in the flow speed, the latter tending asymtotically towards the flow speed of limb E2, F2, F3. As a result the force T1 that is applied to resonator 10 is no longer proportional to the ratio between the resistance of elastic bodies E1 and E2, but additionally brings into play the resistance of flowing bodies F1, F2 and F3.

When force T is cancelled elastic bodies E1 and E2 tend to return to their position of rest. However, since the elongation due to flow is greater along limb F1, E1 than along limb E2, F2, F3, body E2 will still be stressed when body E1 ceases to be. Equilibrium will be restored when the force exerted by E2, due to its elongation, will be compensated by the force due to the compression of E1. Flowing bodies F1, F2, and F3 are thus subjected to a force tending to return them to their initial positions.

Figure 3:
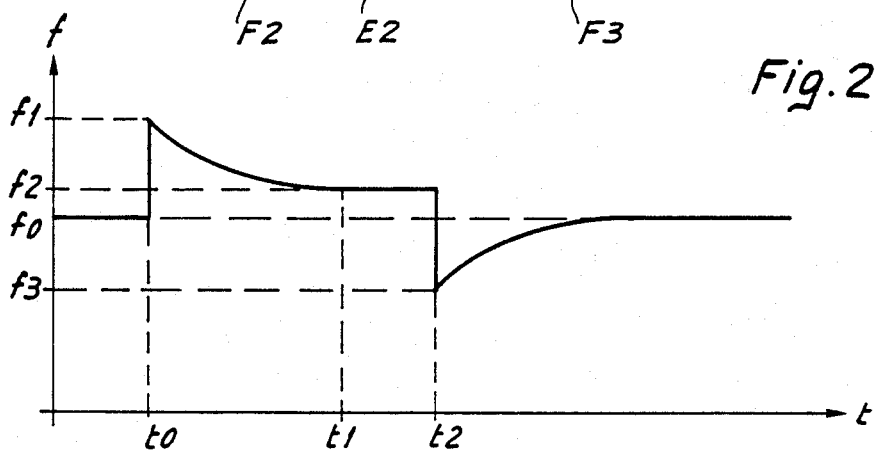
FIG. 3 is a graph illustrating how frequency can vary in a sensor in which some components are subject to flow.

The graph of FIG. 3 shows how frequency will vary with time and with the force being applied, in the above set forth hypothesis.

When no force is being applied, the frequency of the resonator will be f0. When, at time t0, a force T is applied to the sensor, the frequency of the bar increases abruptly to f1 because of the elongation of the resonator.

The frequency then drops progressively to level out, at time t1, to f2 which corresponds to an identical flow speed in both limbs E1, F1 and E2, F2, F3. As long as the forces being applied to the sensor are not modified, the frequency remains constant at f2. At time t2, force T is cancelled. The frequency then drops abruptly to f3. This latter frequency, which is below f0, indicates that the resonator is being subjected to compression. Because of the flowing of bodies F1, F2 and F3, the frequency of the bar tends to level out asymptotically to f0.

The difference between f0 and f1, which is equal to that between f3 and f2, is proportional to force T being applied to the sensor, the coefficient of proportionality bringing into play the elastic resistance of bodies E1 and E2 and not the flow phenomenons.

It is thus theoretically possible to measure the force being applied, by measuring the frequency before and just after the force is applied or cancelled. But the application or the cancellation of the force generates dynamic reactions that disturb the measurement, with the result that the first measured values are not very accurate.

Besides, with such a device it would be impossible to measure a force that varies randomly with time.

Moreover, as is known, the quartz plate in which the resonator is made is so thin that it is liable to buckle under the action of a compressive force that is even less than the maximum allowable tensile force. This means that if body F1 flows to a substantial extent the resonator may be destroyed through buckling when force T stops being applied. It follows from the above that body F1 should flow at the same speed as bodies F2 and F3 or, better still, that there should be no flow at all.

This problem may be resolved by appropriately choosing the means for assembling the resonator and the tube with the supports, and the material for making the tube.

Flow of the tube and/or of the adhesive can cause a distribution of the forces being applied to the tube and resonator, in a ratio other than that between the elastic resistances of the tube and bar. A modification in the distribution of forces can also be brought about by a change in temeperature, if the coefficients of expansion of the tube and resonator are not the same. Such a modification in the distribution of forces may be corrected by the control circuit, insofar as it includes a temperature measurement circuit. However, in practice, it is best to select for the tube a material having a coefficient of expansion as close as possible to that of the material used for the resonator. This choice will have to be all the more stringent when the temperature range in which the sensor is expected to work is broad.

To demonstate this, tests were conducted with a double tuning fork quartz having the following characteristics:

| Size | 15 × 2.9 × 0.175 mm |
|---|---|
| Frequency | 47000 Hz |
| Elongation | 0.46 μm/N |
| Tensile strength (break) | 10 to 12 N |
| Sensitivity | 200 Hz/N |
| Resolution | 2000 points. |

Supports 12 are made of Z10CN18-8 type stainless steel, with portions 121 having a diameter of 4 mm. Tube 16 is also made of Z10CN18-8 steel, with an inner diameter of 4.01 mm, an outer diameter of 4.06 mm and a length of 21 mm. Such tubes are for instance made by Medelec (Switzerland).

A sensor comprising the above components had the following characteristics:

| Size | 27 × 4.06 mm |
|---|---|
| Tensile strength (break) | 30 N |
| Sensitivity | 70 Hz/N |
| Resolution | 2000 points |

A comparison of the characteristics of the resonator as such and of the sensor shows that the sensitivity of the latter is reduced three fold whereas the measurement range is correspondingly increased, thus leaving resolution largely unaffected.

The bonding of the resonator and of the tube to the supports was tested with epoxy, anaerobic and cyanoacrylic adhesives. The best results were achieved with the cyanoacrylic adhesives, e.g. those sold under the designations Cyanolit 101, 201 and 202 by the 3M Corporation (USA), and Sicomet 40 and 85 by Henkel KGaA (Federal Republic of Germany). This type of adhesive is however difficult to use for bonding the tube to the supports because of the great speed at which it polymerises.

The tube can also satisfactorily be bonded to the supports with epoxy adhesives filled with quartz powder. By so filling the epoxy resins, the latter practically stop flowing. Tests conducted with a sensor as described above, in which the tube was bonded to the supports with epoxy adhesive sold under the designation Araldite by Ciba-Geigy AG (Switzerland) mixed with quartz powder and in which the resonator was bonded to the supports with Sicomet 40 adhesive, showed that when a force of 10 to 20N is applied to the sensor for 300 hours, the variation in frequency was less than 2Hz. The sensitivity of the sensor being 70 Hz per N, such a fluctuation amounts to the application of a force 0.03N. Such a result may be deemed satisfactory.

The quartz and the tube could also with advantage be welded to the supports. This method would however be more costly.

Tests were also made with tubes made of aluminium and magnesium. The results were not satisfactory because of the high propensity of these materials to flow.

Figure 4:
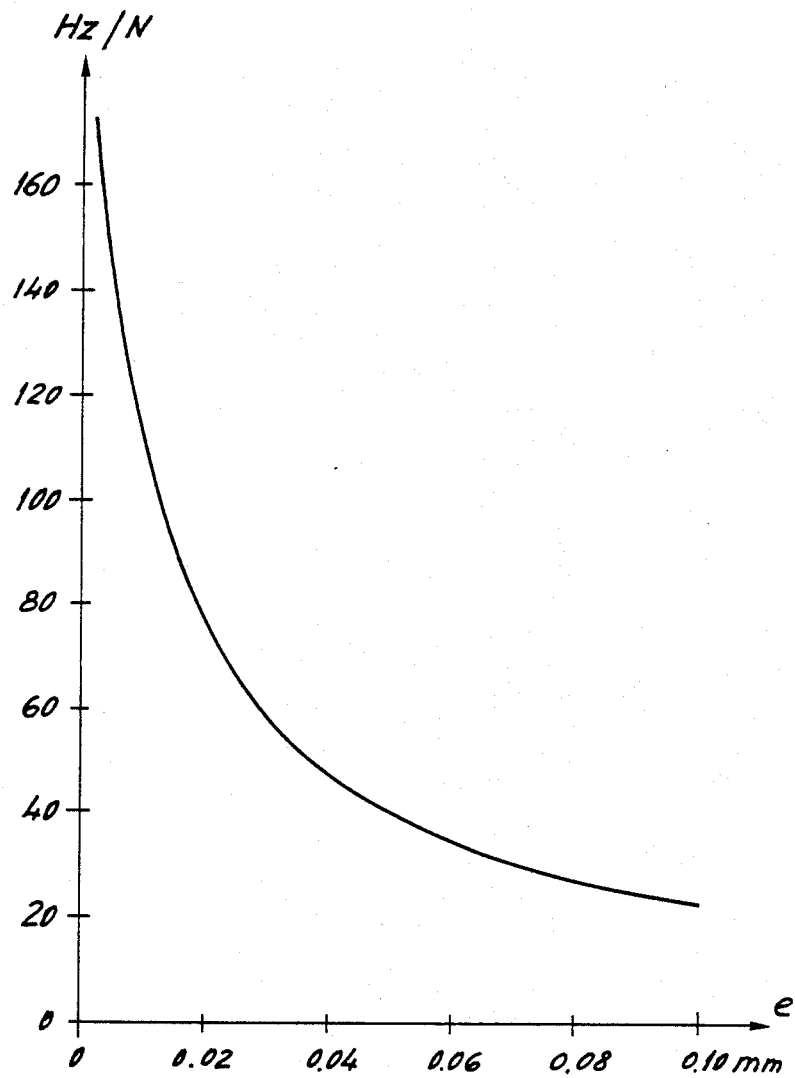
FIG. 4 is a graph illustrating how the sensitivity of the sensor shown in FIG. 1 evolves with tube thickness.

As stated above, tests conducted with a resonator as described, in a tube having a wall thickness of 0.025 mm have shown that sensitivity to traction was reduced by a factor of about three (see FIG. 4). Sensitivity to parasite stresses, in particular forces applied at right angles to the axis of pull, is reduced to a far greater extent. A parasite stress, such as a torque or a perpendicular force, applied to the sensor may be resolved into two components with one acting on the tube and the other acting on the resonator. Thus, and because the sensor is fitted with a tube that surrounds the resonator and is fixed to the supports, the sensitivity of the resonator to stresses applied in a direction other than the normal direction of pull can be very greatly reduced. As a result, it is not necessary to take particular steps for the applied force to be perfectly aligned with the axis of measurement. Further, providing a tube around the quartz helps to protect the latter from dust and other forms of agression to which it may be subjected.

In the above example, sensitivity is reduced by a factor of about 3 by the use of a tube having walls 0.025 mm thick. As is apparent from FIG. 4, the sensitivity of the sensor decreases when the wall of the tube is made thicker. For instance sensitivity is reduced by a factor of two when wall thickness is doubled.

As previously stated, temperature variations can adversely affect measurements if the expansion coefficients of the resonator and of the tube are not matched. The material used for the tube must therefore carefully be chosen.

A tube made of Z10CN18-8 stainless steel gave satisfactory results with a sensor operating at around ambient temperature.

A sensor intended to operate in more extreme temperature conditions is best provided with a tube made of a material having a coefficient of expansion substantially identical to that of the resonator.

In a first modified construction, tube 16 is made of quartz or glass. This is costly and can render the sensor highly fragile.

In a second modified construction, tube 16 is made of Z12CNKDW20 steel sold by AFNOR (France). The coefficient of expansion of this steel is $13.9 \cdot 10^{-7}$ per degree (quartz: $13.7 \cdot 10^{-7}$ per degree). Sensitivity to temperature is thus considerably reduced. The remaining errors may be corrected, if necessary, by electronic circuit 18 which is preferably placed inside tube 16, either on base 103 or 104, or on a surface provided on either seating 122.

The tests were made with a sensor having an enclosed space, defined by tube 16 and supports 12, which is not sealed. This need not be the case. Thus, with a sensor that is subjected to a strongly polluted atmosphere, it is best to isolate resonator 10 in a sealed space lest its frequency be modified by the polluting agents. When the enclosed chamber is sealed the internal pressure may be reduced thereby improving the oscillatory conditions for the resonator 10. It should however be noted that variations in ambient pressure (barometric variations) and in the pressure inside the enclosed chamber (e.g. by heating) induce a parasitic force on the sensor.

In the described examples, when the sensor is at rest the quartz is in principle not under permanent stress. But this need not be so, in which case the measurement limits could be shifted. Thus, for instance, the sensor may be designed to measure compressive rather than tensile forces. To this end, a force should be applied to supports 12 while the tube 16 is being bonded. Resonator 10 is made of quartz, but other materials may be resorted to whether piezoelectric or not.

What is claimed is:

1. A force sensor comprising: a resonator having a frequency that varies with the intensity of a force having to be measured and including an oscillatory bar, a pair of anchor members that are rigidly connected each to a corresponding end portion of the bar and which serve to apply the force having to be measured to the bar, and a tube that surrounds said resonator and which is rigidly secured at each end portion thereof to a corresponding one of said anchor members such that the sensitivity of the resonator to forces applied in directions other than substantially the axial direction of the bar is substantially reduced.

2. A force sensor as in claim 1, wherein said resonator includes a second oscillatory bar each end portion of which is rigidly connected to a corresponding one of said anchor members and which is arranged to oscillate in phase opposition with the first bar to form a double turning fork.

3. A force sensor as in claim 2, wherein each anchor member includes a first portion which is integral with said bars and which forms a base for one of the two tuning forks defining said double tuning fork, and a second portion which provides a support for said base and said tube, said support being rigidly secured to said base and to said tube.

4. A force sensor as in claim 3, wherein said bars and said bases are formed by a quartz plate of constant thickness fitted with control electrodes.

5. A force sensor as in claim 3, wherein said tube and said double tuning fork have end portions that are bonded with adhesive to corresponding ones of said supports.

6. A force sensor as in claim 1, wherein said tube and said bar have substantially identical coefficients of thermal expansion.

7. A force sensor as in claim 1, wherein said bar is made from a thin, substantially flat plate of a fragile piezoelectric material.

8. A force sensor as in claim 7, wherein said piezoelectric material is quartz.

9. A force sensor as in claim 7, wherein each anchor member includes a substantiallly flat plate portion which is integral with and forms a base for a corresponding one of the ends of said bar, a seating portion having a substantially flat surface for supporting said plate portion, and a cylindrical portion having a substantially cylindrical surface for supporting a corresponding one of the end portions of said tube.

10. A force sensor as in claim 9, wherein said flat surface of each seating portion is bonded with a first adhesive to said corresponding plate portion and said cylindrical surface of each cylindrical portion is bonded with a second adhesive to said corresponding tube end portion.

11. A force sensor as in claim 10, wherein said resonator and said first adhesive provide a first limb for transmitting a first component of an applied force between said anchor members, said tube and said second adhesive provided a second limb in parallel with said first limb for transmitting a second component of said applied force between said anchor members, said tube and said first and second adhesives each comprising a body subject to flow, and the speed of flow of said first adhesive body being substantially the same as the combined speeds of flow of said tube body and said second adhesive body.

12. A force sensor as in claim 11, wherein said tube is made of steel, said first adhesive is a cyanoacrylic adhesive, and said second adhesive is an epoxy adhesive filled with quartz powder.

* * * * *

UNITED STATES PATENT AND TRADEMARK OFFICE
CERTIFICATE OF CORRECTION

PATENT NO. : 4,735,103

DATED : April 5, 1988

INVENTOR(S) : Yves Mussard, et al.

It is certified that error appears in the above-identified patent and that said Letters Patent is hereby corrected as shown below:

In claim 2, line 6, change "turning" to --tuning--.

Signed and Sealed this

Second Day of August, 1988

*Attest:*

DONALD J. QUIGG

*Attesting Officer*  *Commissioner of Patents and Trademarks*